INVENTOR.
Lucien F. Wutrich.
BY

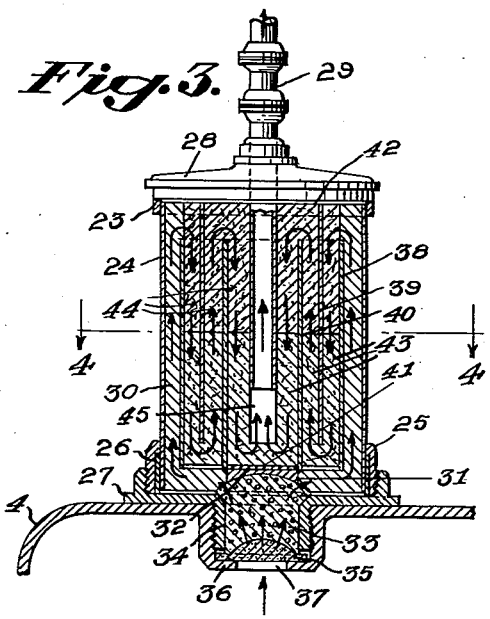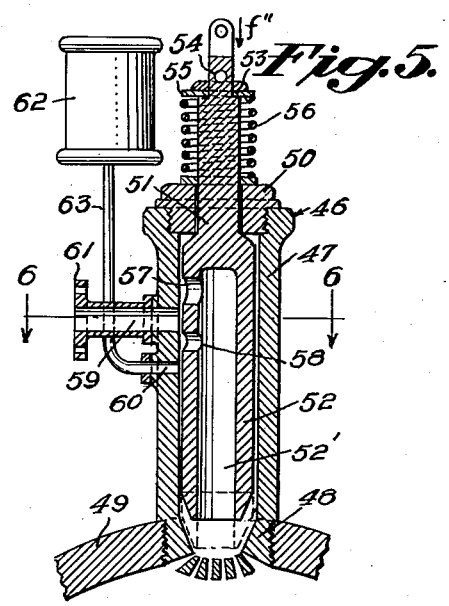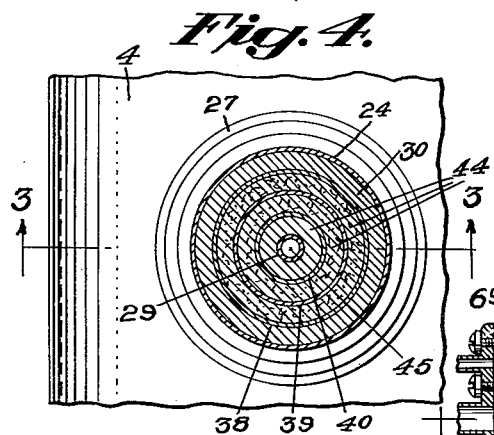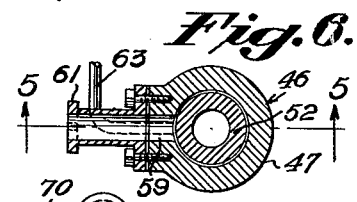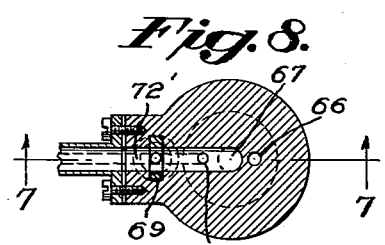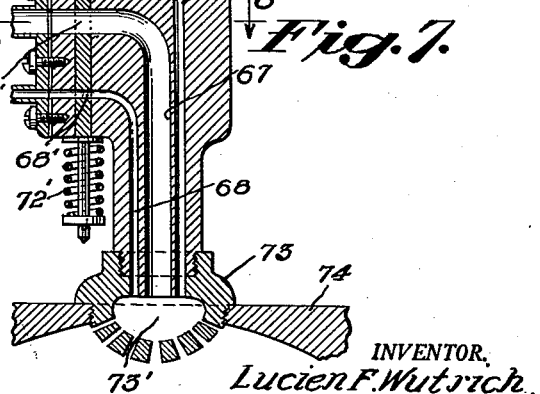
INVENTOR.
Lucien F. Wutrich Aug. 8, 1961   L. F. WUTRICH   2,995,124
DEVICE FOR THE CIRCULATION OF EXHAUST GASES, IN CLOSED
AND SEMI-CLOSED CIRCUITS INTERMITTENTLY, ADAPTABLE
TO INTERNAL COMBUSTION ENGINES
Filed Nov. 17, 1959   3 Sheets-Sheet 3
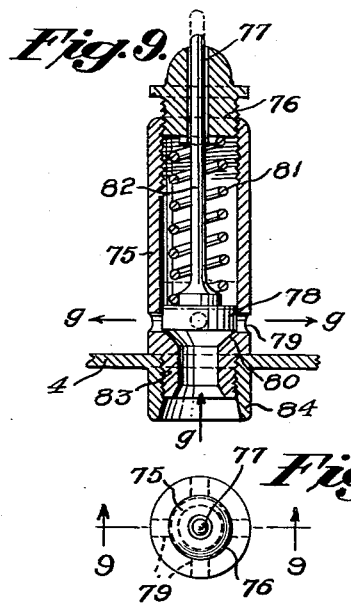
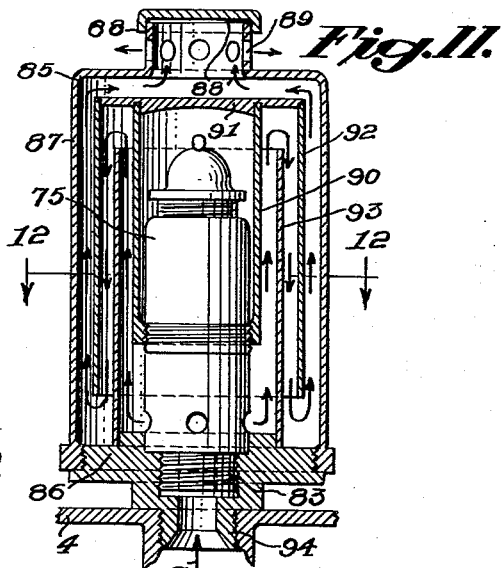
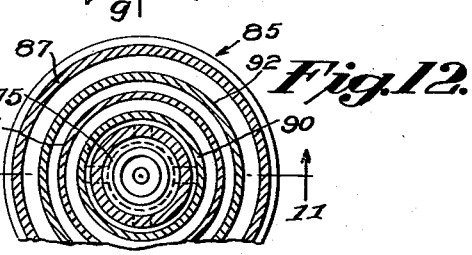
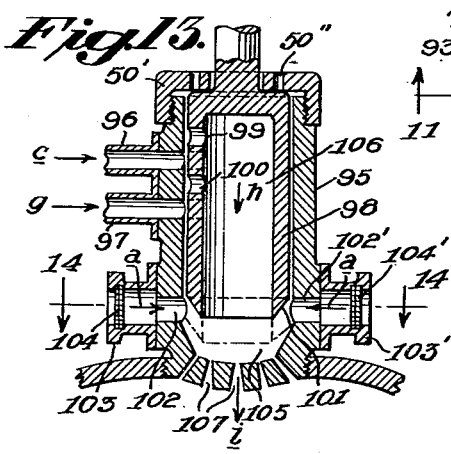
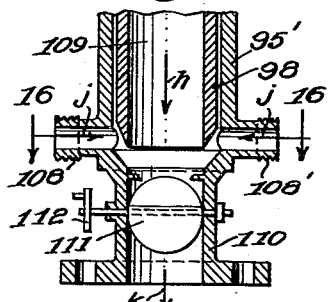
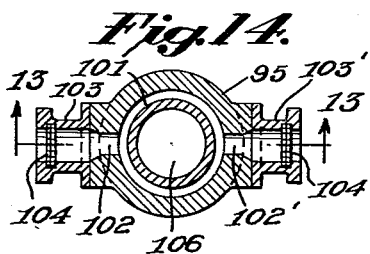
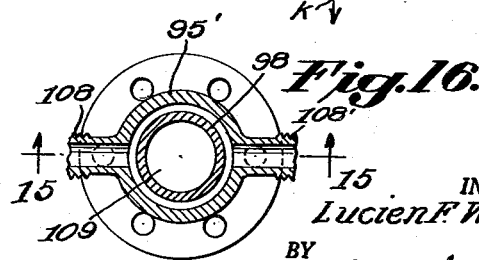
INVENTOR.
Lucien F. Wutrich
BY
Emery L. Groff Jr.
Atty United States Patent Office 2,995,124
Patented Aug. 8, 1961

2,995,124
DEVICE FOR THE CIRCULATION OF EXHAUST GASES, IN CLOSED AND SEMI-CLOSED CIRCUITS INTERMITTENTLY, ADAPTABLE TO INTERNAL COMBUSTION ENGINES
Lucien Fernand Wutrich, 55 Ave. d'Echallens, Lausanne, Switzerland
Filed Nov. 17, 1959, Ser. No. 853,543
Claims priority, application Switzerland Dec. 1, 1958
17 Claims. (Cl. 123—119)

The present invention relates to a device for the circulation of exhaust gases, in closed and semi-closed circuits intermittently, adaptable to internal combustion engines, wherein the manifold for the exhaust gases is connected by a pipe to an accumulator tank having at least two compartments for the expansion of the decreasing pressure exhaust gases, each of said compartments being provided with a safety valve communicating with the outer air. The inlet orifice for the gases in each of said compartments is closed by a valve provided with a return spring, the tension of at least one of the said springs being controlled from the outside of the tank by a screw fixed in the rear wall of the said accumulator. A purifier, communicating with the lower pressure compartment of the accumulator, is connected by a pipe to at least one injection head of the gaseous mixture, secured to the cylinder-head of the engine, the whole being disposed in such a way that the exhaust gases issuing from the manifold, after having undergone a fractional expansion in the accumulator, successively penetrate at low pressure in the purifier and in the injection heads where they are admitted into the gaseous mixture. The exhaust gases, being thus freed from a great part of their impurities and partly cooled, circulate without noise in a closed circuit and their exhaust to the open air is limited to the small quantities discharged by the safety valves in the event of over-pressure in the compartments of the accumulator.

The accompanying drawings show, by way of example, one embodiment of the device according to the invention.

FIGURES 3 and 4 show a purifier for the exhaust gases, FIGURE 3 being a sectional view in elevation along line III—III of FIGURE 4, and FIGURE 4 being a sectional plan view along line IV—IV of FIGURE 3.

FIGURES 5 and 6 show an injection head with two separate inlets, the one for the gaseous mixture and the other for the purified exhaust gases, FIGURE 5 being a sectional view in elevation along line V—V of FIGURE 6, and FIGURE 6 being a sectional plan view along line VI—VI of FIGURE 5.

FIGURES 7 and 8 show a modification of the injection head, comprising three separate inlets, for fresh air, purified exhaust gases and gasoline respectively, FIGURE 7 being a sectional view in elevation along line VII—VII of FIGURE 8, and FIGURE 8 being a sectional plan view along line VIII—VIII of FIGURE 7.

FIGURES 9 and 10 show a safety valve for the accumulator shown in FIGURE 2, FIGURE 9 being a sectional view in elevation along line IX—IX of FIGURE 10, and FIGURE 10 being a plan view of FIGURE 9.

FIGURES 11 and 12 show a modification of the valve shown in FIGURES 9 and 10 with a gas purifying filter, FIGURE 11 being a sectional view in elevation along line XI—XI of FIGURE 12, and FIGURE 12 being a partial sectional plan view along line XII—XII of FIGURE 11.

FIGURES 13 and 14 show an automatic inlet distributor for the cylinder of a commercial engine, FIGURE 13 being a sectional view in elevation along line XIII— XIII of FIGURE 14, and FIGURE 14 being a sectional plan view along line XIV—XIV of FIGURE 13.

FIGURES 15 and 16 show a modification of the distributor shown in FIGURES 13 and 14, with air admission under pressure, for the cylinder of a car engine, FIGURE 15 being a partial sectional view in elevation along line XV—XV of FIGURE 16, and FIGURE 16 being a sectional plan view along line XVI—XVI of FIGURE 15.

Figure 1:
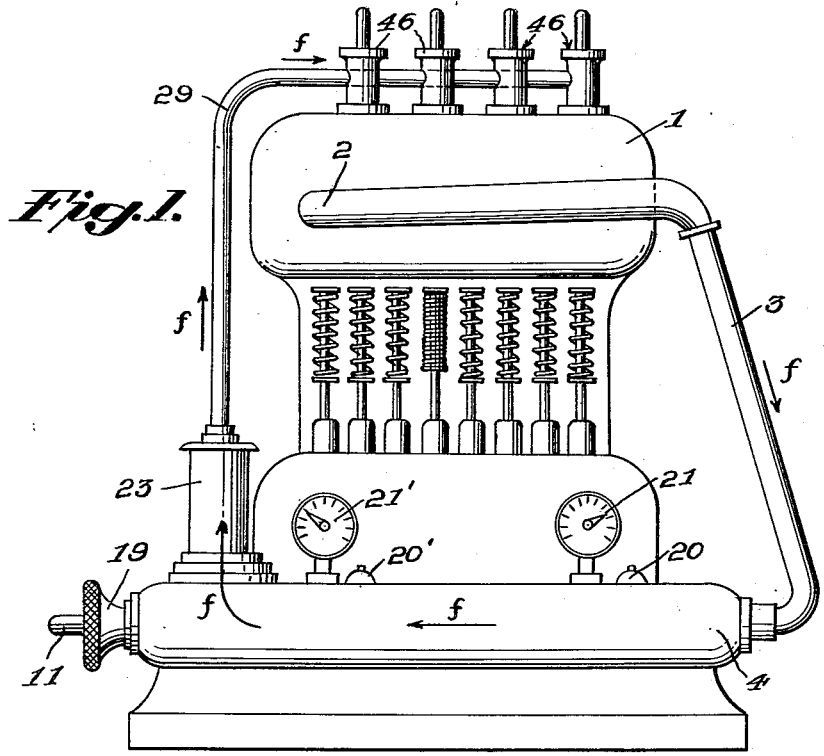
FIGURE 1 is a diagrammatical view in elevation of the device applied to an internal combustion engine.
Figure 2:
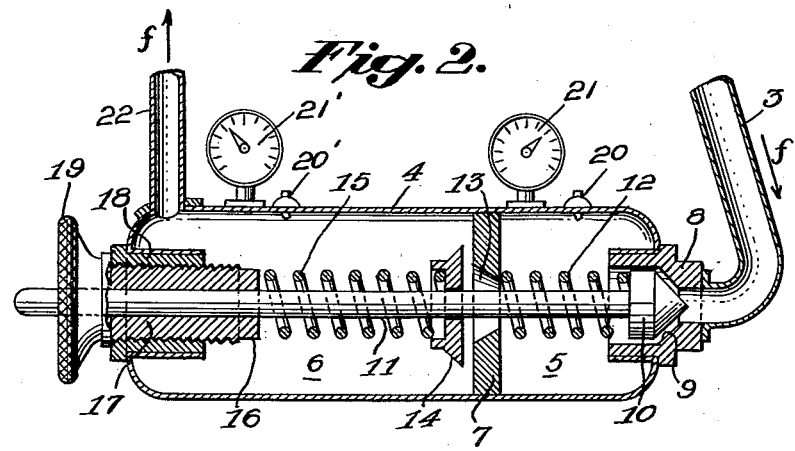
FIGURE 2 is a vertical section of an accumulator with two compartments, for the expansion of the exhaust gases.

In the embodiment shown the device for the circulation of exhaust gases is applied to an internal combustion engine 1 (FIGURE 1), of a known kind, for example, with four cylinders, comprising a manifold 2 for the exhaust gases, connected by a pipe 3 to an accumulator 4 adapted to serve as an expansion tank for the said gases. The accumulator 4, FIGURE 2, may, for example, be of cylindrical shape, and comprises a front compartment 5 and a rear compartment 6, the said compartments being separated by a partition 7.

The pipe 3 is secured to the front wall of the compartment 5 by means of a joint 8, the inner recess 9 of which forms the seat for a valve 10. The valve 10, having, for example, the shape of a cone, is secured to one of the ends of a control shaft 11 and the other end of which is situated outside the tank, the said shaft passing through the two compartments 5 and 6. A coil spring 12, interposed between the valve 10 and the partition 7, is adapted to urge said valve 10 onto its seat 9. The tension of the spring 12 is determined in such a way that the opening of the valve 10 is dependent on the pressure of the exhaust gases penetrating into the compartment 5, while preventing their return to the engine.

The partition 7 is moreover provided with a central bore 13, for example in the shape of a truncated cone, for the passage of the exhaust gases from the front compartment 5 to the rear compartment 6 and also for passage of the shaft 11 therethrough. A closure disc 14, freely slidable on the shaft 11, is adapted to contact the partition 7 for the purpose of closing the bore 13 at the base of the truncated cone-shaped opening. The shaft 11 is surrounded by a coil spring 15, interposed between the disc 14 and the front end 16 of a control screw 17, the said spring being adapted to push the disc 14 against the partition 7.

The screw 17, provided with a central hole in which shaft 11 may move, is engaged in an internally threaded collar 18, said collar being secured to the rear wall of the accumulator 4. The head 19 of screw 17 may be in the shape of a knurled knob, and is placed outside the accumulator to permit controlling the tension of the spring 15, so that the closure disc 14 moves away from the partition 7 under the action of the pressure of the gases enclosed in the compartment 5. This allows the gases to pass into the compartment 6, the tension of the spring 15 being necessarily stronger than that of the spring 12.

Each of the compartments 5 and 6 of the accumulator 4 is also provided with a safety valve 20, 20' respectively, the said valves permitting the discharge of the exhaust gases to the outside air in the event of over-pressure in said compartments. The compartments 5 and 6 are further provided with a pressure gauge 21, 21' respectively, for the control of the pressure of the gases enclosed in said compartments. An outlet duct 22 for the gases flowing from the compartment 6 is fixed on the accumulator 4, the said duct leading to a purifier 23.

The purifier 23, which could also be secured directly to the accumulator 4, as shown in FIGURES 3 and 4, comprises a housing 24, for example a steel tube, the lower part of which is secured, by means of a threaded collar 25 provided with a stuffing-box 26, to a base 27 and the upper part of which is secured to a cover or lid 28 having a central opening for the passage of a pipe 29 for conducting the purified exhaust gases to a distributor described hereafter.

The housing 24 encloses a porous element having the shape of a pot 30, and formed of ceramic material. The bottom of said pot is provided with a central opening 31 in which is fixed, by welding or otherwise, a plate 32, e.g. of copper. The purpose of said plate is to protect the bottom of the pot from heat. The central portions of the inner face of the pot 30 and of the plate 32 are recessed in the shape of a spherical cap so as to be able to house a mass 33 of granulated filtering material, for example fine sand. The said filtering mass 33 is also enclosed in a central neck 34 of the base 27, the lower orifice of the said neck being closed by a disc 35 of filtering material such as porous stone. The neck 34 is provided with an outer thread, so as to be able to fix the same to a cap 36 having a central opening 37 therein for the passage of the exhaust gases. The cap 36 is fixed on the accumulator 4 when the purifier is mounted on the said accumulator, or fixed to the duct 22 (FIGURE 2) when the purifier is branched on the said duct.

Inside the pot 30 are disposed, concentric with the central pipe 29, tubes 38, 39, and 40, the tube 40 being in contact with the inner wall of the pot. The tubes 38 and 40 are moreover secured, at their respective lower ends, to a plate 41 resting on the bottom of the pot 30, the tube 39 being fixed at its upper end to a plate 42, welded to the housing 24.

Empty spaces are provided, on the one hand, between the upper end of the tubes 38 and 40 and the plate 42, and, on the other hand, between the lower end of the tube 39 and the plate 41, the said spaces being adapted for a zigzag circulation of the exhaust gases between the tubes, from the periphery towards the center of the purifier. The annular space included between two adjacent concentric tubes thus serves as a housing for superposed felt linings distributed in the following manner: Between the tubes 38, 39, and 40 respectively, are placed, in the lower part, linings 43 of oil-soaked felt, and in the upper part, linings 44 of dry felt. An empty space 45 is provided under the lower end of the central pipe 29.

The empty space 45 could also serve as a housing for filtering material, for example a coil of flax cloth.

The pipe 29 conducts the purified and partly cooled exhaust gases to the gaseous mixture distributor of the engine 1 comprising, for each of the four cylinders, an injection head 46 (FIGURES 5 and 6) with two inlets. Each of the injection heads 46 comprises a hollow body 47, for example of generally tubular shape, the lower part 48 of which is fixed in the cylinder-head of a combustion chamber 49, shown diagrammatically in FIGURE 5.

In the upper widened out portion of the body 47 there is fixed, for example by screwing, an externally threaded member 50 forming an abutment. The member 50 is provided with a central opening adapted to guide the rod 51 of a tubular member 52 constituting a distribution slide-valve. The hollowed out central part 52' of the member 52 serves as a mixing chamber for the gaseous mixture and the purified exhaust gases. The rod 51 is provided in its upper part with a shoulder 53 on which is fixed, for example by means of a pin 54, a washer 55 serving as a seat for a coil spring 56, surrounding the rod 51 and interposed between the said washer and the abutment 50. The circular wall of the movable member 52 is provided with two superposed radial openings, one opening 57 for the admission of the exhaust gases and the other opening 58 for the admission of the mixture of air and gasoline.

Each of said openings is adapted to coincide with ports 59 and 60 respectively, formed in the circular wall of the hollow body 47, as the slide-valve 52 is moved during the suction period of the cylinder in which is mounted the injection head 46. The pipe 29 (FIGURE 3), conducting the exhaust gases from the purifier 23, is fixed to a tubular joint 61 (FIGURES 5 and 6) communicating with the port 59. The gaseous mixture, arriving from a carburettor 62, is distributed by a conduit 63 to the inlet orifice of the opening 60.

By moving the slide-valve 52 in the direction of the arrow f" (FIGURE 5), during the suction period of the cylinder, the openings 57 and 58 communicate with the ports 59 and 60 respectively, the exhaust gases and the gaseous mixture being then conducted to the combustion chamber 49 passing first of all through the mixture chamber 52' of the said slide-valve.

The abutment 50 could be provided with ducts having vertical axes, for the admission of air inside the body 47 in order to facilitate the movement of the slide-valve 52 in its upward travel. Instead of admitting the gaseous mixture of air and gasoline and the purified exhaust gases into the injection head, the injection head could be provided with three separate inlets.

In a modification, shown in FIGURES 7 and 8, an injection head 64 comprises a body 65, of a general cylindrical shape, in which are bored three ducts, bent at right angles, the said ducts being drilled in the body, that is to say: a duct 66 for the air, a duct 67 for the purified exhaust gases, and a duct 68 for the gasoline. The superposed horizontal branches of the said three ducts are interrupted for the passage of a movable bar 69 therethrough, for example of rectangular section, said bar constituting a distribution slide-valve, having three transverse openings 66', 67', and 68' corresponding respectively to the ducts 66, 67, and 68.

The movement of the bar 69 is controlled in the usual manner by a rocker arm or lever 70 hinged on a support 71 integral with the upper part of the body 65. The bar 69 is further engaged at each of its ends by opposing springs, for example coil springs 72, 72' respectively, designed to limit its vertical movements. The lowerpart of the body 65 is fixed on a support 73 having a central opening 73'. The vertical branches of the ducts 66, 67, 68 lead into said opening 73', forming a mixture chamber, the said support 73 being secured to the combustion chamber 74 of the engine.

The circulation of the exhaust gases in a closed circuit applied to a combustion engine is as follows: the exhaust gases issuing from the manifold 2 are conducted by the pipe 3 into the front compartment 5 of the accumulator 4 (FIGURE 1) after having pushed back, under the action of their pressure, the valve 10 by compression of the spring 12. After the exhaust gases have undergone a first expansion in the compartment 5, they push back disc 14 by compressing spring 15 due to their inherent pressure, and pass into the rear compartment 6 through the truncated opening 13 in the partition 7.

Each of the springs 12 and 15 is set so that its compressive force is a function of the expansion pressure of the gases in the compartments 5 and 6 respectively, so as to ensure their normal flow through the accumulator 4. When the expansion pressures, previously determined and indicated by the pressure gauges 21, 21' of the compartments 5 and 6 respectively, are extraordinarily exceeded, the exhaust gases are discharged into the outer air by the safety valves 20, 20' respectively.

After having undergone a second expansion in the compartment 6, the gases are conveyed by the duct 22 into the purifier 23, when the latter is branched on the said duct, or penetrate directly into the purifier 23 (FIGURE 5) through the central opening 37 of the cap 36, when the purifier is secured to the tank 4.

Inside the purifier 23, the exhaust gases penetrate successively into the filtering disc 35, the filtering mass 33, the pot 30, and then alternately through the filtering linings 44 and 43, following the path indicated by the arrows, and, after having passed through the space 45, are conveyed by the central tube 29 to the injection heads of the engine, the gases having undergone various purifying phases.

The exhaust gases penetrating into the injection heads 46 (FIGURE 5) with two inlets, or 64 (FIGURE 7) with three inlets, through separate ducts 59, 67 respectively, are incorporated through the central opening in the movable member 52 with the gaseous mixture arriving from the carburettor 62, in the case of the injection head 46, or are conveyed directly into the mixture chamber 73', in the case of the injection head 64, the air being brought by the duct 66 and the gasoline by the duct 68. The conveyance of said gaseous products and liquid respectively is controlled by means of the slide-valve 52 and 69 respectively.

According to a preferred embodiment, each of the safety valves 20, 20' (FIGURE 2) of the accumulator 4 comprises a hollow body 75 (FIGURES 9 and 10), of cylindrical shape, the upper part of which is internally threaded to receive an externally threaded control plug 76, provided with a central opening 77. The hollow body 75 encloses a valve 78 designed to close, in the position of rest shown in FIGURE 9, radial ducts 79 situated in the lower part of the hollow body 75. The valve 78 is pushed against its seat 80 by a coil spring 81, the tension of which is controlled by the plug 76, the rod 82 of the valve being guided by the hole 77 in the plug 76. The lower part 83 of the hollow body 75 is secured, for example, by an outer thread, to a sleeve 84 integral with the accumulator 4.

When the pressure of the exhaust gases, enclosed in one of the compartments 5 or 6 of the accumulator, exceeds an admissible value, the valve 78, by rising from its seat, occupies the position shown in dot and dash lines in FIGURE 9, thus uncovering the radial ducts 79 through which the gases escape into the outer air, by following the direction of the arrows g, the spring 81 pushing back the valve against its seat when the pressure of the gases inside the accumulator has been lowered below the admissible value.

According to a modification of the embodiment of the valve just described, the hollow body 75 (FIGURES 11 and 12) is housed inside a gas purifying filter 85, similar to the purifier 23 (FIGURES 3 and 4). The filter 85 comprises a base 86, of a generally cylindrical shape, in the central part of which is fixed the lower part 83 of the hollow body 75. To the periphery of the base 86 is secured the tapped lower end of a cylindrical casing 87, the upper part of which, of a smaller diameter, is constituted by a funnel 88, closed by a cap 88', the said funnel being provided with radial orifices 89 for the escape of the purified gases.

Inside the casing 87 are disposed concentric tubes, designed to form zigzag passages for the circulation of the gases. To this end, the hollow body 75 is provided midway of its height with a thread for fixing the lower end of a tube 90, the upper end of which fits in the boss formed by a disc 91. On the periphery of the disc 91 is fixed a tube 92, the free lower end of which is situated at a certain distance from the base 86 so as to provide a passage for the gases being purified. Between the concentric tubes 90 and 92 is interposed a tube 93, secured at its lower end to the periphery of a boss formed by the base 86, the free upper end of the said tube 93 being spaced from the disc 91 so as to provide a passage for the gases being purified.

The annular space, included between the concentric tubes 90, 93, 92 and the casing 87, is filled with absorbing material, for example iron shavings, designed to purify the exhaust gases which pass therethrough in the direction of the arrows, as shown in FIGURE 11.

The lower part 94 of the base 86 is fixed to the accumulator 4, for example in the same manner as that described for the hollow body 75.

Instead of the injection heads described above and shown in FIGURES 5 to 8, the device for the circulation of the exhaust gases, applied to a commercial engine, could comprise on each cylinder of the said engine an automatic distributor for the simultaneous admission of the motor fuel, the exhaust gases, and the fresh air.

In the embodiment shown in FIGURES 13 and 14, the distributor comprises a hollow body 95, of generally cylindrical shape, to the periphery of which are fixed, for example in a vertical plane, an inlet pipe 96 for the motor fuel, for example gasoline (arrow c), and an inlet pipe 97 for the purified exhaust gases (arrow g). Inside the hollow body 95 may move a slide-valve 98, of tubular shape, provided with radial openings 99, 100, the said openings being disposed on the same side as the orifices of the tubes 96 and 97 respectively, the lower edge 101 of the said slide-valve having a conical shape.

The upper end of the hollow body is provided with a thread for securing a lid 50', provided with ducts 50" having vertical axes, the said ducts being designed to admit air inside the body 95 in order to facilitate the movement of the slide-valve 98 in its upward stroke.

In its lower part, the hollow body 95 is provided with radial openings for the admission of fresh air, for example openings 102, 102', placed at the ends of a common diameter, each of said openings communicating with a tubular body 103, 103' respectively, having a horizontal axis, the said tubular body being provided with a filter 104, 104' respectively, comprising a wire netting, the said filters serving to hold back the impurities in the air.

The air penetrating, in the direction of the arrows a, through the filters in the holes of the tubular body and of the hollow body respectively, is directed by the chamfered edge of the slide-valve 98 into a chamber 105 of the said hollow body where it is incorporated in the motor fuel and the purified exhaust gases, which are sucked down through the central passage 106 of the slide-valve 98, in the direction of the arrow h. The mixture is then admitted into the corresponding cylinder of the engine through ducts 107, disposed fanwise in the inner wall of the hollow body 95, in the direction of the arrow i.

According to a modification, the automatic distributor, applied to each of the cylinders of a motor car, comprises in the lower part of a hollow body 95' (FIGURES 15 and 16), of cylindrical shape, two radial conduits 108, 108', placed at the ends of a common diameter. The said radial conduits are designed to bring air under pressure inside the hollow body 95', in the direction of the arrows j, in which space the said air under pressure is mixed with the motor fuel and the purified exhaust gases, sucked in together through the central passage 109 of the slide-valve 98. The resulting gaseous mixture is then drawn along in the direction of the arrow k in the corresponding cylinder of the engine through the lower part 110, of tubular shape, of the hollow body 95', the said part being provided with a control shutter 111, actuated by a lever 112, in known manner.

It is obvious that the air inlets 102, 102' (FIGURE 13) and 108, 108' (FIGURE 15) of the automatic distributor could be placed at the top of the hollow bodies 95, 95' respectively, and that the positions of the inlet tubes 96 for the motor fuel and 97 for the purified exhaust gases could be inverted.

The automatic distributor described is particularly advantageous in that it simplifies the admission of the gaseous mixture into the cylinders of the engine while eliminating the carburettor.

In the circulation device described, the exhaust gases, freed of a great part of their impurities and partly cooled, circulate without noise in a closed circuit and their escape to the outer air is limited to the small quantities discharged by the safety valves in the case of excess pressure in the compartments of the accumulator.

Moreover, the circulation of the gases in a closed circuit by means of the accumulator and the purifier described could be applied to commercial engines, fed, for example, by gases from subterranean or other sources.

I claim:

1. A device for the circulation of exhaust gases in closed or semi-closed circuits intermittently, adaptable to internal combustion engines having a cylinder head, a plurality of cylinders therein, and an injection head for each cylinder secured to said cylinder head, comprising, in combination, a manifold for the exhaust gases, a pipe connecting said manifold to an accumulator tank, said accumulator having at least two compartments for the expansion of the decreasing pressure exhaust gases, a safety valve for each of said compartments, said valves communicating with the outer air, each of said compartments having an inlet orifice for said gases, and a valve provided with a return spring for closing said inlet orifices, means for controlling the tension of at least one of said springs from the outside of the tank, a purifier communicating with the lower pressure compartment of the accumulator, a pipe connecting said purifier to at least one of said injection heads secured to the cylinder head of the engine, whereby the exhaust gases issuing from the manifold, after having undergone a fractional expansion in the accumulator, successively penetrate at low pressure into the purifier and into the injection heads where they are admitted into the gaseous mixture, freed of a great part of their impurities and partly cooled, the said exhaust gases circulating without noise in a closed circuit and their exhaust into the open air being limited to the small quantities discharged by said safety valves in the event of excess pressure in the compartments of the accumulator.

2. A device according to claim 1 wherein said accumulator includes a front and a rear compartment, a partition having a centrally disposed opening separating said compartments, a connecting member secured to the inlet orifice of said front compartment and communicating with the pipe leading to said manifold, a control screw having a central opening therein fixed in the rear wall of said rear compartment, an axially disposed rod passing through said control screw, and said partition and having a first valve member secured to its forward end for seating engagement within said connecting member, a second valve member slidable on said rod and located in said rear compartment of the accumulator, spring means surrounding said rod and normally urging said first and second valve members into seated position, whereby the exhaust gases entering the accumulator from the manifold will, depending on the compressive force thereof, overcome the tension of said springs, open the respective valves, and pass through the accumulator to the purifier for further treatment.

3. A device according to claim 2, wherein the purifier comprises a tubular casing, the lower end of which is fixed to a base, said base provided with a central tube for the admission of the gases to be purified, the upper end of said casing provided with a lid to which is fixed a central pipe for the exhaust of the purified gases, the lower end of said pipe located adjacent the bottom of the casing, a ceramic pot enclosed by said casing, the gases issuing from the central tube of the base circulating upwardly along the wall of said pot, said pot enclosing a plurality of concentric metallic tubes, alternately fixed to a lower metallic plate, in the bottom of the pot, and to an upper metallic plate secured to said tubular casing by the lid of the purifier, linings of filtering material placed between each of the said concentric tubes, whereby the gases to be purified circulate inside the purifier alternately upwards and downwards from the periphery towards the center, through the filtering linings, and are discharged, after having been purified, through the central pipe fixed to the lid of the purifier.

4. A device according to claim 3, wherein the said filtering linings are of dry felt.

5. A device according to claim 3, wherein said filtering linings are of oil-soaked felt.

6. A device according to claim 3, wherein the bottom of the ceramic pot has a central opening, a copper plate secured within said opening to protect the bottom of said pot from heat.

7. A device according to claim 3, wherein the central tube of the base encloses a filtering mass.

8. A device according to claim 7, wherein said filtering mass is fine sand.

9. A device according to claim 3, wherein the lower orifice of the central tube of the base is closed by a disc of filtering material.

10. A device according to claim 9, wherein said filtering material is porous stone.

11. A device according to claim 1, wherein the injection head comprises a tubular body, fixed at its lower end to the combustion chamber of a cylinder of the engine, the upper part of said body being provided with an abutment having a central opening, a vertically slidable valve having a stem portion passing through said central opening and a hollow body portion forming a mixing chamber disposed within the tubular body of said injection head, the wall of said valve body portion having two vertically spaced and aligned openings, each of the openings adapted to lie opposite a corresponding port in the wall of the tubular body when said slide valve is in seated position to permit passage of the purified exhaust gases and the gaseous mixture of air and gasoline arriving from the carburettor of the engine into said mixing chamber within said slide valve, whereby during the suction period of the engine cylinder, the openings of the slide-valve being placed opposite the ports in the tubular body, the exhaust gases and the gaseous mixture are fed into the mixing chamber, formed by the central opening in the tubular body, in which the mixture of the motor fuel takes place before being admitted into the compression chamber of the engine.

12. A device according to claim 1, wherein said injection head comprises a substantially cylindrical body, secured to the combustion chamber of a cylinder of the engine by means of a support having a mixing chamber formed therein, said body having three substantially right angular ducts therein communicating at their lower ends with said mixing chamber, the superposed horizontal parts and the vertical parts of the said ducts being respectively parallel one with the other, a movable bar comprising a distribution slide-valve slidable in a hole formed in the cylindrical body, said bar being provided with transverse openings which place themselves, during the suction period of the cylinder, between the lengths of the respective horizontal parts of the said ducts, the intermediate duct, of a diameter equal to the combined diameter of the two other ducts, being designed for the feed of the purified exhaust gases and the other two ducts for the feed of fresh air and gasoline respectively to the mixture chamber, the said three fuels mixing together in the said mixing chamber before being admitted into the compression chamber of the engine.

13. A device according to claim 1, wherein said safety valve comprises a hollow body, a valve slidable within said body and normally urged to seated position in the lower part of the hollow body by means for a coil spring surrounding the rod of the said valve, a control plug secured to the upper end of said body and guiding said rod, said plug serving as an abutment for one end of said spring to control the tension thereof, the wall of said body opposite said valve being provided with radial holes for the discharge of the exhaust gases out of the accumulator.

14. A device according to claim 13, wherein said safety valve is secured to the base of a filter, said filter comprising a cylindrical casing and at least an inner concentric tube, an absorbent material within the annular space between the concentric tubes, said absorbent material adapted to purify the exhaust gases issuing from the said radial orifices in the hollow body of the valve and fed through the said concentric tubes, said tubes forming zigzag passages to the upper end of said filter, forming a funnel, the wall of the said funnel being provided with holes for the discharge to the outer air of the exhaust gases freed of their impurities.

15. A device according to claim 1, wherein said injection head for the gaseous mixture comprises a hollow body, a slide-valve provided with a central chamber and two superposed radial holes, said slide-valve being movable within said hollow body, the hollow body being provided with corresponding radial holes in its side wall, a tube secured to said hollow body at the outlet of each of the radial holes therein, said tubes being designed to bring the motor fuel and the purified exhaust gases respectively into the central chamber of the said slide-valve, the hollow body also having two radial holes located respectively at its lower end, each of said holes communicating with a tubular member having a filter therein and being designed to bring fresh air into a mixing chamber formed by the lower wall of said hollow body, said lower wall being provided with ducts for the passage of the gaseous mixture inside the corresponding cylinder of the engine.

16. A device according to claim 15, wherein conduits for the air under pressure are fixed to the periphery of the hollow body, the air under pressure being admitted through holes in the walls of the hollow body and the slide-valve which it encloses, into the central chamber of said slide-valve in order to be incorporated in the mixture of the motor fuel and the purified exhaust gases, the resulting gaseous mixture being then sucked into the said mixture chamber.

17. A device according to claim 1, wherein the order in which each of the injection intakes is placed on the hollow body, secured to each of the cylinders of the engine, is interchangeable.

References Cited in the file of this patent

UNITED STATES PATENTS

| | | |
|---|---|---|
| 1,120,828 | Lowry | Dec. 15, 1914 |
| 1,296,115 | Pfeifer | Mar. 4, 1919 |
| 2,126,616 | Cayabyab | Aug. 9, 1938 |
| 2,446,094 | Mattice | July 27, 1948 |
| 2,673,446 | Salardi | Mar. 30, 1954 |